Patented May 26, 1931

1,807,355

UNITED STATES PATENT OFFICE

WILLIAM P. ter HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.  Application filed May 19, 1930. Serial No. 453,864.

This invention relates to the treatment of rubber and similar vulcanizable materials, more particularly to a treatment of the same with the reaction product of an aliphatic ketone and a secondary aromatic amino compound. The invention also relates to the products of such treatment.

This case is a continuation-in-part of application Serial No. 411,665, filed Dec. 4, 1929.

An object of this invention is to provide a class of materials which will retard the deterioration of rubber. Another object is to check or retard the ageing of rubber whether such ageing be due to the influence of oxygen or heat or both. Another object is to improve the resistance of rubber to abrasion. A further object is to check or retard the formation of pin holes or cracks in carbon black stocks such as tire tread stocks. Other objects will be apparent from the description below.

Accordingly the invention comprises treating rubber or similar vulcanizable materials with a reaction product of an aliphatic ketone and a secondary aromatic amino compound or a mixture of such reaction products. Examples of such products are the reaction products of acetone and diphenyl amine, acetone and phenyl alpha-naphthylamine, acetone and phenyl beta-naphthylamine, acetone and diphenyl ethylene diamine, acetone and monoethyl aniline, methyl ethyl ketone and phenyl alpha-naphthylamine, mesityl oxide and phenyl alpha-naphthylamnie, acetone and diphenyl formamidine, mesityl oxide and phenyl beta-naphthylamine, acetone and diortho tolyl guanidine, acetone and diphenyl guanidine, acetone and p-p′ di (naphthylamino) diphenyl methane, acetone and ortho tolyl biguanide.

The following is illustrative of the invention and is not to be construed as limiting thereof:

*Example 1*—The reaction between acetone and diphenyl amine is preferably carried out at relatively high temperatures and high pressures in the presence of a dehydration agent, such as iodine which also has a catalytic effect on the reaction. The amount of acetone may vary from one to three moles per one mole of diphenylamine. For example 320 pounds of diphenylamine, 220 pounds of acetone, 600 grams of iodine are heated during 20 hours at approximately 220° C. The pressure is approximately 600 pounds per square inch at this temperature. An iron autoclave may be used with or without agitation. At the end of about 20 hours the contents are cooled and the excess acetone and water formed are distilled off. The remaining product is a dark brown liquid which may be used as such in the rubber or further purified. The reaction time may be shortened by raising the temperature, for example at a temperature of 260° C. a reaction time of 12 hours is sufficient. It has also been found that increasing the iodine shortens the time of reaction, for example the use of 1000 grams of iodine allows a satisfactory reaction in about 12 hours. Instead of using iodine, hydrochloric acid may be used.

The exact nature of the reaction product is not definitely known. It is believed that at least one of the reaction products may be a di-hydro acridine derivative of the probable formula:

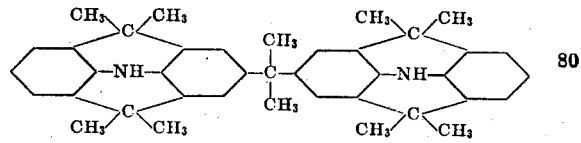

The reaction product prepared above when distilled may be separated into a liquid fraction and a solid fraction which are about equally strong as antioxidants.

*Example 2*—A carbon black tread stock in which the parts are by weight is made up in the usual manner by mixing on a mill. It comprises 100 parts of smoked sheet rubber, 13 parts of zinc oxide, 50 parts of carbon black, 3.5 parts of sulphur, 1 part of hexamethylenetetramine, 0.25 part of diphenyl guanidine, and 1.25 parts of the reaction product of Example 1. A similar mix is made from which the antioxidant is omitted. The mixes are cured during 60 minutes and 75 minutes at 45 lbs. per sq. inch steam pressure.

Tensile, ageing and abrasion data are given below.

|  | Blank | Stock containing 1.25 parts of the antioxidant |
|---|---|---|
| Green tensiles: | | |
| 60' at 45#  | 4205 | 4197 |
| 75' at 45#  | 4332 | 4457 |
| Relative wear before ageing: | | |
| 60' cure  | 136 | 133 |
| 75' cure  | 136 | 132 |
| After ageing 168 hours in oxygen: | | |
| 60' stock  | 87 | 123 |
| 75' stock  | 81 | 115 |
| Aged tensiles 168 hours oxygen: | | |
| 60' at 45#  | 2415 | 3355 |
| 75' at 45#  | 2220 | 3360 |
| Aged tensiles 3 weeks at 158° F.: | | |
| 60' at 45#  | 1685 | 3117 |
| 75' at 45#  | 1391 | 2803 |

The unaged stocks were also tested for their flex cracking values, that is their resistance to cracking under repeated stresses due to alternate stretching and bending. Values are given in kilocycles, one kilocycle indicating a complete cycle of stretching and bending repeated 1000 times. Definite cracking of the stock indicates the end point. Results are as follows:

| Cure: | No. of kilocycles causing failure | |
|---|---|---|
|  | Blank | +1.25 pts. of the antioxidant |
| 60' at 45#  | 85 | 175 |
| 75' at 45#  | 61 | 194 |

The reaction product of Example 1 has practically no effect in either accelerating or retarding the cure. For example a stock containing 100 parts smoked sheet, 10 parts zinc oxide, 3.5 parts of sulphur, 42 parts carbon black and 1.25 parts diphenyl guanidine gave the following values:

| Green tensiles | Blank | +1.5 pts. of the antioxidant |
|---|---|---|
| 60' at 45#  | 3445 | 3640 |
| 75' at 45#  | 3765 | 3770 |

In a similar stock but using hexamethylene tetramine as the accelerator a similar effect is shown by the following:

| Green tensiles | Stock content 0.75 pt. hexamethylene tetramine | Stock content 0.75 pt. hexamethylene tetramine + 2 parts of the antioxidant |
|---|---|---|
| 60' at 45#  | 3434 | 3500 |
| 75' at 45#  | 3585 | 3617 |

The effect on heat ageing of the same reaction product is shown by the values below, obtained with a similar carbon black tread stock in which hexamethylene tetramine is used as the accelerator.

|  | Blank | Stock containing 1.5 pts. of the antioxidant |
|---|---|---|
| Green tensiles: | | |
| 60' at 45#  | 4205 | 4307 |
| 75' at 45#  | 4332 | 4313 |
| Aged tensiles 24 hrs. at 212° F.: | | |
| 60' at 45#  | 1875 | 2698 |
| 75' at 45#  | 1570 | 2498 |

The reaction product of Example 1 is also a powerful antioxidant for bus and truck tire inner tubes. This is shown by the values given below in connection with a stock, with and without the antioxidant, consisting of 100 parts rubber, 10 parts zinc oxide, 2 parts sulphur, 1.25 parts of the condensation product of butyr aldehyde and aniline, and fillers. The stocks were cured for 5 minutes at 60 pounds per sq. in. steam pressure; they were also subjected to a severe ageing test by exposure during 8 hours at 245° F. at 100% elongation to air at a pressure of 70 pounds per sq. inch.

|  | Blank | Stock containing 1 part of the antioxidant |
|---|---|---|
| Green tensiles: | | |
| 5' at 60#  | 3842 | 3852 |
| Aged tensiles 8 hrs. at 245° F.: 100% Elong. 70# air | | |
| 5' at 60#  | 23 | 1190 |

When used in an ordinary rubber tiling stock the life of such highly compounded rubber stocks is effectively increased by even very small amounts of the reaction product of Example 1. The results of ageing in oxygen at 60° C. and at a pressure of 300 lbs. per sq. inch is given below:

| Antioxidant | Amount, based on rubber content | Time of failure |
|---|---|---|
| None |  | 24 hours |
| Reaction product | .225% | 168 hours |
| Reaction product | .45% | 288 hours |
| Reaction product | .675% | 408 hours |

*Example 3.—Reaction product of acetone and phenyl beta naphthylamine:* A mixture of 219 grams phenyl beta naphthylamine, 696 grams acetone and 10 grams of iodine are heated at approximately 210 to 220° C. during 33 hours. The pressure at this temperature is approximately 600 pounds per square inch. The crude reaction product is filtered through glass wool and the excess of acetone and the water formed during the reaction are removed by distillation. This material when tested in a carbon black tread stock similar to those set forth in Example 2 gave the following results:

|  | Blank | Stock containing 1 part by weight of acetone phenyl beta naphthyl amine reaction product |
| --- | --- | --- |
| Green tensiles: 60′ at 45#.......... | 4118 | 4291 |
| Aged in air 3 wks. at 158° F.: 60′ at 45#.......... | 2695 | 4256 |

*Example 4.*—The reaction product of acetone and phenyl alpha-naphthyl-amine. This chemical is made according to the general procedure, namely by heating a mixture of 219 grams phenyl alpha naphthyl amine, 116 grams of acetone, and 1.3 grams of iodine during 20 hours at approximately 210 to 220° C. The product which remains after removal of acetone and water is a free-flowing oil which when tested as an antioxidant in a carbon black tread stock, in which hexamethylene tetramine and diphenyl guanidine were used as accelerators, gave the following results:

|  | Blank | Stock containing 1.25 parts acetone-phenyl alpha naphthyl-amine reaction product |
| --- | --- | --- |
| Green tensiles: 60′ at 45#.......... 75′ at 45#.......... | 4292 4217 | 4190 4295 |
| Aged tensiles 168 hrs. in oxygen: 60′ at 45#.......... 75′ at 45#.......... | 1809 1621 | 2730 2935 |

The same chemical was also tested in a bus and truck inner tube stock in which a butyraldehyde-aniline condensation product was used as the accelerator. The results are as follows:

|  | Blank | + 1.25 parts acetone-phenyl alpha-naphthyl-amine reaction product |
| --- | --- | --- |
| Green tensiles: 5′ at 60#.......... 10′ at 60#.......... | 2352 3653 | 3773 3447 |
| Aged tensiles, 8 hrs. at 245° F. 100% elongation 70 lbs. air: 5′ at 60#.......... 10′ at 60#.......... | 98 64 | 424 400 |

*Example 5.*—Reaction product of acetone and mono-ethyl aniline. This material is made by heating a mixture of 363 grams mono-ethyl aniline 696 grams of acetone, and 10 grams of iodine during 24 hours at approximately 200° C. The reaction product was tested in a carbon black tread stock in which hexamethylene tetramine was used as the accelerator:

|  | Blank | Stock containing 1.5 parts acetone-mono-ethyl aniline reaction product |
| --- | --- | --- |
| Green tensiles: 60′ at 45#.......... 75′ at 45#.......... | 4233 4140 | 4287 4243 |
| Aged tensiles 168 hrs. in oxygen: 60′ at 45#.......... 75′ at 45#.......... | 1130 1036 | 3320 2873 |

These results show the condensation product of acetone and ethyl aniline to be an excellent antioxidant.

*Example 6.*—The reaction product of acetone and diphenyl ethylene diamine. A mixture of 212 grams of diphenyl ethylene diamine, 348 grams of acetone and 5 grams of iodine is heated in an iron autoclave during approximately 24 hours at 200° to 240° C. The product which was freed from acetone and water was tested in a carbon black tread stock in which dinitro-phenyl-dimethyl-dithio-carbamate was used as the accelerator.

|  | Blank | + 1 pt. acetone-diphenyl ethylene diamine reaction product |
| --- | --- | --- |
| Green tensiles: 60′ at 25#.......... 70′ at 25#.......... | 4070 4870 | 4630 4340 |
| Aged tensiles 96 hrs. in oxygen: 60′ at 25#.......... 70′ at 25#.......... | 1633 1596 | 2755 2588 |

*Example 7.*—The reaction product of acetone and p, p′-di-(napthylamino) diphenyl methane: The latter compound is first made by heating a mixture of one mole of p, p′-diamino diphenyl methane and 2 moles of beta naphthol at approximately 260° C. during 20 hours in the presence of a dehydrating agent (calcium chloride or iodine). The chemical constitution of this compound is probably as follows:

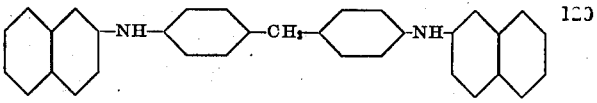

A mixture of 312 grams of p. p′-di-(naphthylamino) diphenyl methane, 696 grams of acetone, and 10 grams of iodine is heated during 24 hours at approximately 200° C. After removing the excess of acetone and the water formed during the reaction a solid residue remains. This material was tested in a carbon black tread stock in which hexamethylene tetramine was used as the accelerator:

|  | Blank | + 1 part acetone-p,p'-di-(naphthyl-amino) diphenyl methane reaction product |
|---|---|---|
| Green tensiles: | | |
| 60' at 45# | 4268 | 4584 |
| 75' at 45# | 4356 | 4509 |
| Aged tensiles 168 hrs. in oxygen: | | |
| 60' at 45# | 1107 | 3003 |
| 75' at 45# | 957 | 2868 |

*Example 8.*—The reaction product of methyl ethyl ketone and diphenyl amine: This material is made according to the general procedure of heating the ketone and the amine in the presence of iodine in an autoclave. The amounts used were:

338 gms. diphenylamine
296 gms. methyl-ethyl-ketone
2 gms. iodine.

The reaction is carried out at 220° C. during 24 hours. The material which was obtained was tested in a carbon black tread stock in which hexamethylene tetramine and diphenyl guanidine were used as the accelerators:

|  | Blank | + 1 part methyl ethyl ketone-diphenyl-amine reaction product |
|---|---|---|
| Green tensiles: | | |
| 60' at 45# | 4265 | 4237 |
| 75' at 45# | 4235 | 4402 |
| Aged tensiles 168 hrs. in oxygen: | | |
| 60' at 45# | 1168 | 2559 |
| 75' at 45# | 880 | 2455 |

*Example 9.*—The reaction product of mesityl oxide and phenyl beta-naphthylamine: The product is made in an autoclave according to the usual procedure, from:

800 gms. of phenyl-beta-naphthylamine
800 gms. of mesityl-oxide
10 gms. of iodine, and gave the following results when tested in a carbon black tread in which dinitrophenyl dimethyl dithiocarbamate was used as the accelerator:

|  | Blank | + 1 part mesityl oxide phenyl beta-naphthyl amine condensation product |
|---|---|---|
| Green tensiles: | | |
| 60' at 45# | 4460 | 4683 |
| 75' at 45# | 4677 | 4463 |
| Aged in air 24 hrs. at 212° F.: | | |
| 60' at 45# | 1117 | 2563 |
| 75' at 45# | 924 | 2533 |

*Example 10.*—The reaction product of mesityl oxide and phenyl alpha-naphthylamine: This material is made by heating 139 grams of phenyl alpha-naphthylamine, 124 grams mesityl oxide, and 1.5 grams iodine during approximately 20 hours at 220° C. 168 grams of a viscous black oil are obtained, which is freed from methyl-ethyl-ketone and from water. In a carbon black tread stock in which hexamethylene tetramine and diphenyl guanidine were used as the accelerators the results obtained with this chemical were as follows:

|  | Blank | + 1 part mesityl oxide phenyl alpha-naphthylamine reaction product |
|---|---|---|
| Green tensiles: | | |
| 60' at 45# | 3890 | 3820 |
| 75' at 45# | 3930 | 4080 |
| Aged tensiles 168 hrs. in oxygen: | | |
| 60' at 45# | 1373 | 2597 |
| 75' at 45# | 1328 | 2968 |

*Example 11.*—The reaction product of methyl-ethyl-ketone and phenyl alpha-naphthylamine: This material is made in the usual manner from:

219 gms. of phenyl alpha-naphthylamine
148 gms. of methyl-ethyl-ketone
1.3 gms. of iodine.

The material when tested in a carbon black tread stock gave the following results:

|  | Blank | + 1 part methyl-ethyl-ketone-phenyl alpha-naphthylamine reaction product |
|---|---|---|
| Green tensiles: | | |
| 60' at 45# | 3890 | 3995 |
| 75' at 45# | 3930 | 3980 |
| Aged tensiles 168 hrs. in oxygen: | | |
| 45' at 45# | 1373 | 2506 |
| 60' at 45# | 1328 | 2498 |

The results of using the new antioxidants will vary depending on the ketone and amine used in the reaction. Other ketones than those mentioned that may be used are phorone, diethyl ketone, mono-chlor-acetone, dichloracetone, aldol-acetone, diacetyl, acetylacetone, acetonyl acetone, diacetone alcohol, ethylidene-acetone, allyl-acetone, aceto-phenone, benzal acetone, furfural-acetone, salicyl aldehyde-acetone, cyclopentanone, cyclohexanone. Other secondary amino compounds than those mentioned that may be used are dinaphthyl amines, naphthyl amino diphenyl, carbazole, p-nitro diphenyl amine, 2,4 dinitro-diphenyl amine, p-amino-diphenylamine, p-hydroxy-diphenylamine, sym-diphenyl-p-phenylene diamine, p-amino benzyl-aniline, p-amino p'-naphthylamino diphenyl methane, sym-dinaphthyl-p-phenylene diamine, phenyl beta naphthyl guanidine, phenyl o-tolyl guanidine, di-o-tolyl biguanide, mono phenyl biguanide, diphenyl biguanide. Certain dehydrating agents have been mentioned as giving particularly effective results, but the invention generally is not to be limited thereto. Other dehydrating agents may be used such as calcium chloride, sulfanilic acid, phosphorus pentoxide, sodium hydroxide, magnesium perchlorate, acetic acid, barium oxide, zinc chloride, the amine addition product with zinc chloride such as $(C_6H_5NH_2)_2ZnCl_2$, sulphuric acid, silica gel, etc.

It is to be understood that the term "aliphatic ketone" includes both saturated and unsaturated aliphatic ketones of the open-chain and cyclo-aliphatic series, as well as hydroxyl- and halogen-substituted derivatives of such ketones, and ketones obtained by condensation of the foregoing with aldehydes and ketones,—and that the term also includes ketones comprising one aliphatic group and one aromatic group linked to the

group.

It is further to be understood that the term "secondary aromatic amino compound" includes broadly any aromatic amino compound which comprises at least one secondary amino nitrogen atom linked to an aromatic nucleus.

It is to be understood that a mixture of the reaction products may be used in rubber instead of a single reaction product. Also that a mixture of ketones or a single ketone may be reacted with a single amino compound or with a mixture of amino compounds to give products that may be used in rubber in the same manner.

The chemicals disclosed may be used to improve the properties as mentioned herein of inner tubes, tires, thread, hose, dipped goods, mechanical goods, latex or articles made from latex, in fact of rubber of any type or form. The term "rubber" is to be construed as including natural rubber, gutta percha, balata, synthetic rubber or other rubber-like materials.

Although certain theories have been set forth to aid in explanation of the invention, it is to be understood that the invention is not to be limited thereby.

With the detailed description given above, it will be obvious that modifications will suggest themselves, for example the product resulting from the reaction of the ketone and amino compound may also be prepared by reacting the corresponding thio ketone or the corresponding ketone dihalide with the amino compound—also other accelerators and compounding ingredients than those specifically mentioned may be used in conjunction with the antioxidants,—all without departing from the principle of the invention, and it is not desired to limit the invention otherwise than as set forth in the appended claims.

Having thus described my invention, what I claim and desire to protect by Letters Patent is:

1. A process of treating rubber which comprises incorporating therewith the reaction product of an aliphatic ketone and a secondary aromatic amino compound.

2. A process of treating rubber which comprises incorporating therewith the reaction product of an aliphatic ketone and a secondary aromatic amine.

3. A process of treating rubber which comprises incorporating therewith the reaction product of an aliphatic ketone and a diaryl amine.

4. A process of treating rubber which comprises incorporating therewith the reaction product of acetone and a secondary aromatic amine.

5. A process of treating rubber which comprises incorporating therewith the reaction product of acetone and a diaryl amine.

6. A process of treating rubber which comprises incorporating therewith the reaction product of acetone and diphenylamine.

7. A process of treating rubber which comprises vulcanizing rubber in the presence of the reaction product of acetone and diphenylamine.

8. A process of treating rubber which comprises vulcanizing rubber in the presence of the reaction product of acetone and phenyl beta-naphthylamine.

9. A process of treating rubber which comprises vulcanizing rubber in the presence of the reaction product of acetone and p-p' di (naphthylamino) diphenyl methane.

10. A process of treating rubber which comprises vulcanizing rubber containing a vulcanizing agent, a metallic oxide, and an organic accelerator in the presence of the reaction product of an aliphatic ketone and a secondary aromatic amino compound.

11. A process of treating rubber which comprises vulcanizing rubber containing a vulcanizing agent, a metallic oxide, and an organic accelerator in the presence of the reaction product of an aliphatic ketone and a secondary aromatic amine.

12. A process of treating rubber which comprises vulcanizing rubber containing sulphur, zinc oxide, and an organic accelerator in the presence of the reaction product of an aliphatic ketone and a secondary aromatic amine.

13. A process of treating rubber which comprises vulcanizing rubber containing a vulcanizing agent, a metallic oxide, and an organic accelerator in the presence of the reaction product of an aliphatic ketone and a diarylamine.

14. A process of treating rubber which comprises incorporating therewith a material having the properties of a product obtained by reacting acetone and diphenylamine in the presence of iodine.

15. A process of treating rubber which comprises vulcanizing rubber containing sulphur, zinc in combination, and an organic accelerator in the presence of a material having the properties of a product obtained by reacting acetone and diphenylamine in the presence of iodine.

16. A rubber product derived from rubber treated with the reaction product of an aliphatic ketone and a secondary aromatic amino compound.

17. A vulcanized rubber product derived from rubber treated with the reaction product of an aliphatic ketone and a secondary aromatic amino compound.

18. A rubber product derived from rubber treated with the reaction product of an aliphatic ketone and a secondary aromatic amine.

19. A vulcanized rubber product derived from rubber treated with the reaction product of an aliphatic ketone and a secondary aromatic amine.

20. A rubber product derived from rubber treated with the reaction product of acetone and a diaryl amine.

21. A vulcanized rubber product derived from rubber treated with the reaction product of acetone and a diaryl amine.

22. A rubber product derived from rubber treated with the reaction product of acetone and diphenylamine.

23. A vulcanized rubber product derived from rubber treated with the reaction product of acetone and diphenylamine.

24. A vulcanized rubber product resulting from the process as set forth in claim 8.

25. A vulcanized rubber product resulting from the process as set forth in claim 9.

26. A rubber product derived from rubber treated with a material having the properties of a product obtained by reacting acetone and diphenylamine in the presence of iodine.

27. A vulcanized rubber product derived from rubber treated with a material having the properties of a product obtained by reacting acetone and diphenylamine in the presence of iodine.

Signed at Passaic, county of Passaic, State of New Jersey, this 10th day of May, 1930.

WILLIAM P. ter HORST.